US010009117B2

(12) United States Patent
Sydir et al.

(10) Patent No.: US 10,009,117 B2
(45) Date of Patent: Jun. 26, 2018

(54) DATA STORAGE, INPUT, AND OUTPUT FOR HUMAN BODY COMMUNICATION

(71) Applicant: Intel Corporation, Santa Clara, CA (US)

(72) Inventors: Jaroslaw J. Sydir, San Jose, CA (US); Anand S. Konanur, Sunnyvale, CA (US); Ulun Karacaoglu, San Diego, CA (US); Anthony G. LaMarca, Seattle, WA (US); Stephen R. Wood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/583,584

(22) Filed: Dec. 26, 2014

(65) Prior Publication Data

US 2016/0211925 A1 Jul. 21, 2016

(51) Int. Cl.
*G05B 19/00* (2006.01)
*H04B 13/00* (2006.01)
(52) U.S. Cl.
CPC .................................. *H04B 13/005* (2013.01)
(58) Field of Classification Search
CPC .................................................... H04B 13/005
USPC .................. 340/5.64, 5.8, 539.11, 573.1
See application file for complete search history.

(56) References Cited

U.S. PATENT DOCUMENTS

| | | | |
|---|---|---|---|
| 6,223,018 B1 * | 4/2001 | Fukumoto et al. ............... | 455/4 |
| 6,859,657 B1 | 2/2005 | Barnard et al. | |
| 7,202,773 B1 * | 4/2007 | Oba et al. ...................... | 340/5.8 |
| 2002/0030585 A1 * | 3/2002 | Doi ...................... | A61B 5/0028 340/5.64 |
| 2005/0070778 A1 | 3/2005 | Lackey et al. | |
| 2009/0124282 A1 * | 5/2009 | Kim ...................... | H04B 13/005 455/550.1 |
| 2011/0125535 A1 * | 5/2011 | Gross .................... | G06F 19/323 705/3 |
| 2012/0003929 A1 * | 1/2012 | Hyoung ................ | G06F 1/3231 455/41.1 |
| 2012/0023169 A1 * | 1/2012 | Kang ................... | H04B 13/005 709/205 |

(Continued)

FOREIGN PATENT DOCUMENTS

EP 1096722 B1 5/2001

OTHER PUBLICATIONS

Search Report dated Dec. 22, 2016, issued in related Taiwan (R.O.C.) Patent Application No. 104139146, 2 pages.

*Primary Examiner* — Brent Swarthout
(74) *Attorney, Agent, or Firm* — Schwabe, Williamson & Wyatt, P.C.

(57) ABSTRACT

Data can be transferred from one device to another in the Internet of Things without using a network by a touch-based human body communication (HBC) interaction between a wearable storage module and HBC-compatible interface pads on external host devices. Information on a source host device is copied to the wearable storage module when the user touches the source device's HBC interface pad, can be stored indefinitely on the wearable module, and is copied to a destination host device when the user touches the destination devices HBC interface pad. Because the interface pads only need to be simple electrodes, their size and shape can be widely varied to fit the host devices.

17 Claims, 4 Drawing Sheets

(56) References Cited

U.S. PATENT DOCUMENTS

2015/0182160 A1\* 7/2015 Kim ..................... A61B 5/0488
                                                                600/301
2015/0326997 A1\* 11/2015 Agardh ................ H04W 4/008
                                                                455/41.2
2015/0372770 A1\* 12/2015 Ouzounov ............ H04W 4/008
                                                                455/41.2

\* cited by examiner

DATA STORAGE, INPUT, AND OUTPUT FOR HUMAN BODY COMMUNICATION

RELATED APPLICATIONS

None

FEDERALLY SPONSORED RESEARCH AND DEVELOPMENT

None

APPENDICES

None

FIELD

Related fields include Human Body Communications (HBC), and more particularly using wearable devices to exchange data with off-body devices.

DETAILED DESCRIPTION

Figure 1A:
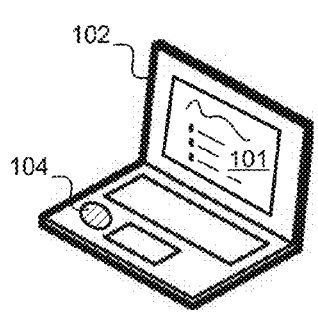
FIGS. 1A-1F illustrate an example of a use of a human body communication storage module (HBCSM) and body-coupled networks of multiple wearable HBC electronics.

Even as network connections become more and more available both in and out of the office, and cloud servers become more versatile and easier to use, there are still occasions for people to hand-carry a portable storage module (PSM) with data from one device and manually transfer the data to another device. Where privacy and security are critical concerns, hand-carrying the data thwarts potential leaks in the transmission channel. While it is still possible to intercept a physical storage medium in transit, it is generally more difficult and risky than splitting off network traffic. There are also situations where a new device does not yet have the passwords and other credentials to connect to the network. There are environments where wireless communication may interfere with sensitive critical technology such as life-support or navigation, and yet wired connections can be difficult. Moreover, there are still places networks have not reached, and times when they may fail.

Some of the desirable features of a PSM include convenience, robustness, low likelihood of loss, and intuitive ease of use. To fully realize the potential accessibility benefits of the Internet of Things (IoT), the PSM preferably does not require superior eyesight, dexterity, or technical expertise. Such versatility would also make the PSM easy to use in tight spaces, in low lighting conditions, or while wearing safety goggles. Preferably, the source and destination host devices (those that exchange data with the PSM) would offer a robust interface that imposes looser constraints on miniaturization and fewer failure opportunities than a recessed socket subjected to repeated connection and disconnection stresses and potentially allowing dust, contaminants, and foreign objects access to interior electronics.

Another desirable feature would be highly selective connectivity, e.g., 1:1 connectivity or at least unidirectional short-range connectivity. Opportunities for error may be reduced if each of several neighboring host devices do not need to somehow determine whether a PSM is requesting access to it or to some other device. Security and privacy may be enhanced if the PSM signal only goes to the intended host device, rather than every receptive (and possibly planted or compromised) device nearby.

Finally, if the PSM were to be integrated with or attached to something the user is accustomed to carrying, it (and its potentially sensitive or hard-to-replace data) would be less likely to be lost or forgotten than an "extra" Object that is small and potentially delicate.

In summary, technology users would benefit from a more natural-feeling, convenient, robust, and yet highly selective and controllable way to transfer data without using a network.

A wearable PSM configured for human body communication (HBC, also known as intra-body communication and body-coupled communication) uses a simple electrode as an interface to host devices. A user wearing the PSM (or having the PSM in a pocket) simply touches a host device's interface electrode to establish communication with the host device. The signals travel between the host device and the PSM over the surface of the user's skin.

FIGS. 1A-F illustrate an example of a use of a human body communication storage module (HBCSM) and body-coupled networks of multiple wearable HBC electronics. In FIG. 1A, presentation 101 is available on laptop computer 102, which is the source host device (S-host) in this example. Laptop computer 102 has been equipped with HBC pad 104, which may only expose an electrode surface to the outside world.

Figure 1B:
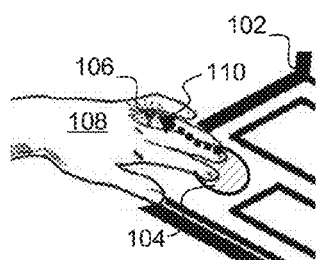
Figure 1C:
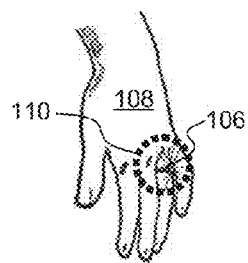

In FIG. 1B, a user wearing an HBC storage module (HBCSM) in the form of a ring 106 on hand 108 touches the HBC pad 104 on S-host 102. Data and control metadata 110 for wirelessly pairing laptop 102 to wireless display 112 travels in the electric field over one or more fingers of hand 108 to be stored in HBCSM 106. In some embodiments, HBCSM 106 is passive and also receives the power to operate through human body electrical path 110 while the user's hand 108 is touching HBC pad 104.

In FIG. 1 C, pairing information 110 is stored in HBCSM 106, which may include nonvolatile storage to retain the data indefinitely after HBCSM. 106 is powered off.

Figure 1D:
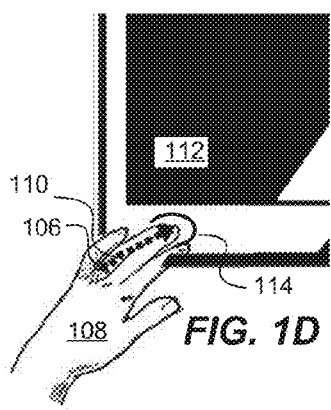

In FIG. 1D, user's hand 108 touches HBC pad 114 on wireless display 112 (the destination host device or D-host). The pairing information 110 travels from HBCSM 106 down the fingers of hand 108 into an HBC receiver inside D-host 112 behind HBC pad 114.

Figure 1E:
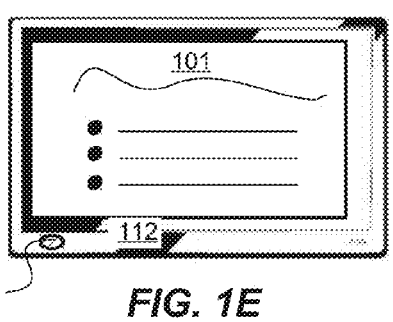
Figure 1F:
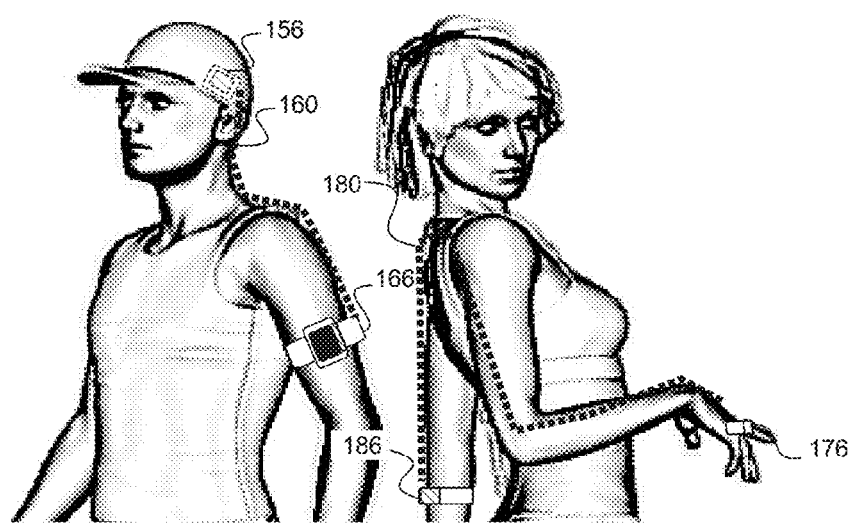

In FIG. 1E, wireless display 112 is instantly paired to laptop 102, using a wireless display protocol or other RF protocol, without the need for a lengthy wireless scan or a compatible cable of appropriate length. Presentation 101 is immediately displayed on wireless display 112 and the event can begin. This streamlined process may be very useful, for example, at events where multiple speakers are tightly scheduled with strictly limited time.

Alternatively, data and metadata 110 could be the entire presentation 101; for example, if the laptop 102 and wireless display 112 are not within pairing range, if laptop 102 or wireless display 112 do not have wireless pairing capabilities, if the user does not want to connect laptop 102 with all its information to an untrusted network, or if laptop 102 would not have to be brought along for any other reason.

Although some host devices may operate only as sources or and others may operate only as destinations, many general-purpose devices such as personal computers, GPS units, and smart phones may operate as either S-hosts or D-hosts as desired. For example, suppose the entire presentation 101 had been copied to storage connected with wireless display 112. Another event attendee or support staff member, given permission to have a copy of presentation 101, and wearing an HBCSM of his or her own, could get a copy simply by touching HBC pad 114.

Numerous types of data may be stored on an HBCSM and transferred through an HBC interface, including but not limited to wireless pairing information e.g., Bluetooth), text from a document, GPS coordinates, credentials such as account numbers from banks and utilities, member numbers, shopping reward points, frequent-flyer miles, encryption and decryption keys, and others. Likewise, numerous device types may act as hosts, including but not limited to computers, wireless displays, Bluetooth devices, GPS navigation units, printers, point of sale terminals, ATMs, kiosks, transportation ticket dispensers and electronic check-ins, parking-structure gates, self-service checkout machines in stores and libraries, or electronic locks.

FIG. IF illustrates HBC devices forming body-coupled networks. Signal 180 travels between HBC ring 176 and HBC bracelet 186. Meanwhile signal 160 travels between HBC hatband insert 156 and sports-band-mounted multi-purpose device 166 (e.g., music player, radio, or global positioning system (GPS) with an HBC interface added).

In a body-coupled network, an HBCSM may store information generated by other HBC-connected devices on the user's body (e.g., cameras, microphones, air-quality sensors, heart-rate monitors, thermometers, and the like).

Figure 2A:
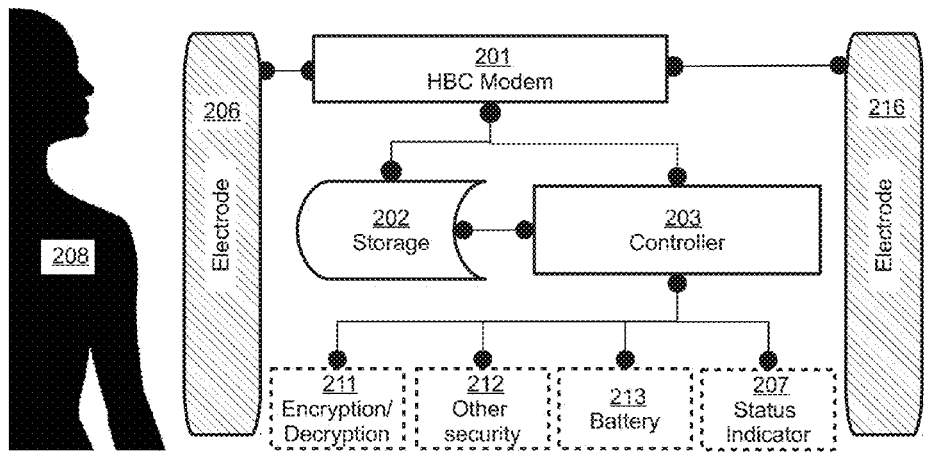
FIGS. 2A-2B are block diagrams of an HBCSM and an HBC interface on a host device.
Figure 2B:
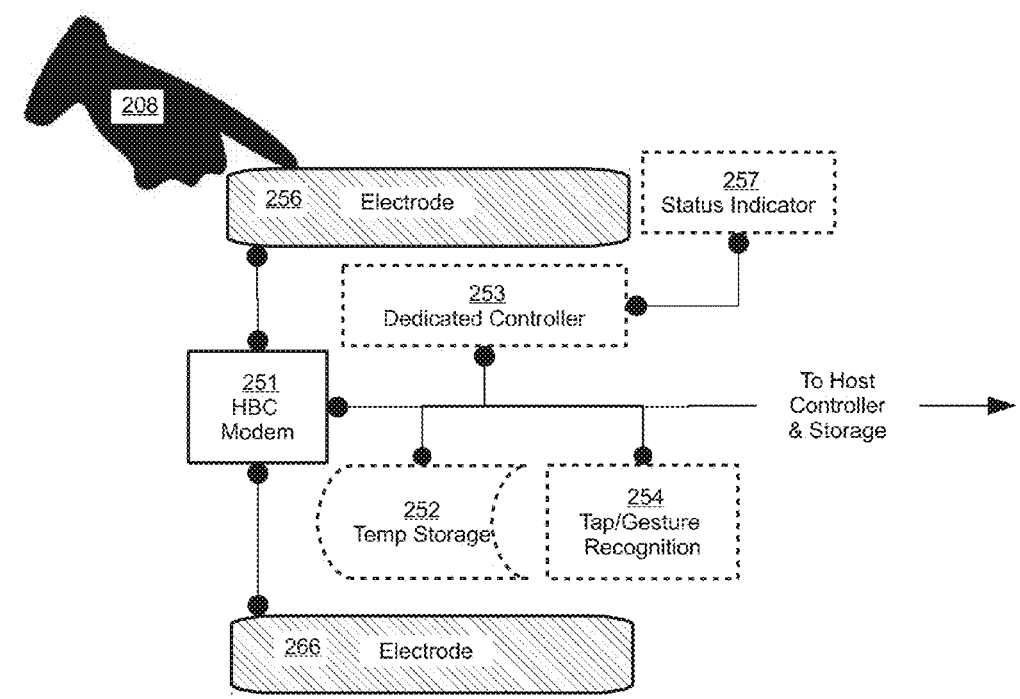

FIGS. 2A-B are block diagrams of an HBCSM and an HBC interface on a host device. FIG. 2A is a block diagram of an example of an HBCSM. A first external electrode 206 faces toward the user's body 208 and a second external electrode 216 faces away from user's body 208. The other components may be enclosed in the housing of the HBCSM. In some embodiments, the electrodes may also be enclosed in the housing, as the body-facing electrode may not require full skin contact, but only skin proximity.

Body-facing electrode 206 and outward-facing electrode 216 are connected to RBC modem 201. HBC modem 201 may include, among other components, a transmission buffer, transmitter, receiver, and receiving buffer. HBC modem 201 is also connected to controller 203 and storage element 202. Controller 203 and storage element 202 are also connected to each other. may also be included in HBC modem 201. They may also have their own connections to controller 203, or controller 203 may control them through HBC modem 201. Optionally, the HBCSM may also include encryption and/or decryption capability 211, or other security elements 212 such as biometric sensors, or accelerometers capable of recognizing a pass-gesture made by moving the HBCSM in a certain way.

An optional status indicator 207 (visible, audible, or haptic) may be included to inform user 208 that a connection has been successfully formed and/or when the data transfer is finished. This can keep the user from breaking the connection too soon to get the entire file and its control metadata, or from thinking the HBCSM has successfully connected to the host when in fact it has not.

In some embodiments, the HBCSM will not have an onboard power source; it will remain passive and powered off until connected with an S-host or a D-host by a user's touch. At that point, the HBCSM will draw power from the S-host or D-host through the HBC pad. In other embodiments, the HBCSM may include a battery or other power source 213. This arrangement may be useful when the HBCSM is connected in a body-coupled network with other wearable HBC devices that are themselves passive.

FIG. 2B is a block diagram of an example of an HBC interface for a host device. Electrode 256 is the RBC pad; its outer surface is accessible to be touched by user 208 to connect with the HBCSM that the user is wearing. Touch-responsive electrode 256 and second electrode 266 are connected to HBC modem 251. HBC modem 251 may include, among other components, a transmission buffer, transmitter, receiver, and receiving buffer. The HBC interface may make use of supporting electronics that are already on the motherboard or elsewhere in the host device. Alternatively, one or more of a dedicated controller 253, storage element 252, or recognition module 254 for taps and gestures may be coupled to the HBC modem.

In some embodiments, it may be desirable for the host device to authenticate a user or confirm request. For example, user authentication may be desirable if the file request may be for confidential information or the use of the host device is restricted, for example to employees with clearances or to adult members of a household. Request confirmation may be appropriate if the transaction wilt have consequences that are difficult to reverse; for instance, electronically transferring money, signing a contract, or clocking in or out of work. In those cases, confirmation may take the form of a series of taps or a pass-gesture that is much less likely to be done accidentally than simply touching the HBC pad. For those applications, the host would need to recognize this confirmation signals.

An optional status indicator 257 (visible, audible, or haptic) may be included to inform user 208 that a connection has been successfully formed and/or when the data transfer is finished. This can keep the user from breaking the connection too soon to get the entire file and its control metadata, or from thinking the HBCSM has successfully connected to the host when in fact it has not.

Figure 3:
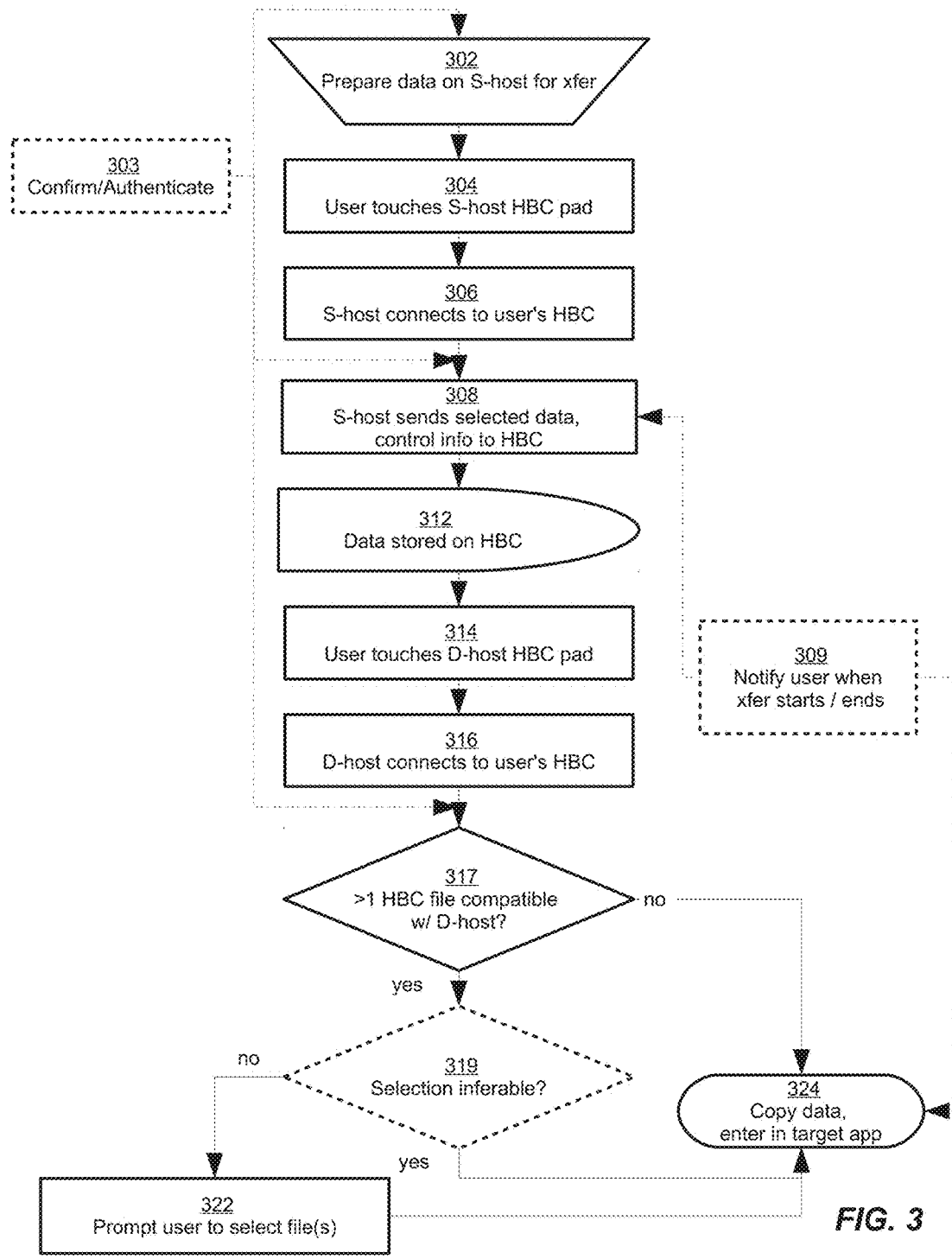
FIG. 3 is a flowchart of an example of a process for transferring data between a source host device and a destination host device using an HBCSM.

FIG. 3 is a flowchart of an example of a process for transferring data between a source host device and a destination host device using an HBCSM. The data on the S-host that is to be transferred (copied or moved) to the HBCSM is prepared in step 302. For example, in some embodiments that store the data as files, this preparation may entail opening the file, highlighting the file in a directory, or simply turning the S-host on. Optionally, a request confirmation 303 may be part of the preparation to ensure that the proper file or files are selected, although there are other points in the process at which it may be done. In some embodiments, the preparation may include extracting part of the information from a file on the S-host, such as some of the text from a document or some of the numbers from a spreadsheet.

Communication between the S-host and the HBCSM is triggered when the user touches the HBC pad of the S-host in step 304. If the HBCSM is passive, the proximity to the S-host powers it up and the two devices execute the connection protocol in step 306. Optionally, authentication of the user or confirmation of the request to connect with this particular S-host may occur in an inserted step 303. The data transfer from the S-host to the HBCSM proceeds in step 308. Optionally, the S-host may provide feedback on the status of the transaction in step 309; notifying the user when a successful connection has been made and/or when the data transfer is finished. A visible light, an audible tone, or a vibration or other haptic sensation may begin when the connection is made, continue while the date is being transferred, and end when the transaction is complete. In some embodiments, the light, tone, or sensation may pulse or otherwise change character when the transfer is complete, to avoid mistaking an accidentally broken connection for completion of the transfer. If the host device has a display screen, the status may be displayed there. Alternatively, the HBCSM may include an indicator providing status feedback.

Once the data has been transferred to the HBCSM, it is retained for some duration of time in step 312. The duration may be anywhere from a few seconds to a few years. Some stored data, such as electronic tickets for events, may only be useful for a limited time. Other data, such as passwords and contact lists, may be useful for a much longer time.

When the user is ready to transfer the data from the HBCSM to a D-host, he or she initiates contact by touching the D-host's HBC pad in step 314. The contact enables the two devices to connect in step 316, optionally including a request confirmation or user authentication 303. If the D-host finds only one file of a type it uses as input, it may automatically process that file. However, there may be occasions when the D-host finds more than one file on the HBCSM of the expected input type (e.g., a GPS finds two or three compatible navigation files) at decision point 317. In these instances it may not be clear which data the user intends the D-host to process.

In some embodiments, the D-host may include contingency programming to infer a most likely selection at decision point 319 when it finds multiple candidates. For example, if the GPS calculates that only one of the navigation files is less than 200 miles from the user's present position, it may infer that the user wants to go to the local destination. In general, the choice may not be that obvious, the device's programming may not be that advanced, or it may be important not to make a mistake. In that case, the D-host simply prompts the user to select the desired files at step 322.

Once the correct file is identified, the D-host may copy the data from the HBCSM and enter it in the target application (e.g. spreadsheet, word processor, calendar, contact list) in step 324. Optionally, the D-host or HBCSM may notify the user when the transfer starts in and/or ends in step 309.

FIGS. 4A-H illustrate examples of HBCSM form factors. An HBCSM, like many other wearable electronics, can be embodied in a wide range of form factors. Some may be built into existing devices such as mobile phones, smart watches, or enhanced-reality glasses. Others may not "look technological" at all.

Figure 4A:
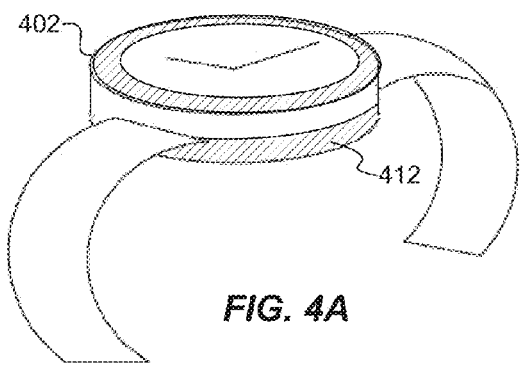
FIGS. 4A-4H illustrate examples of HBCSM form factors.
Figure 4B:
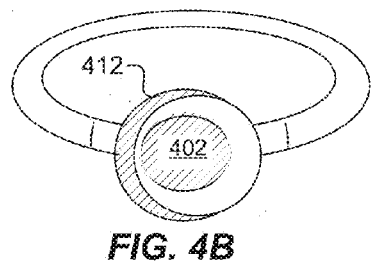
Figure 4D:
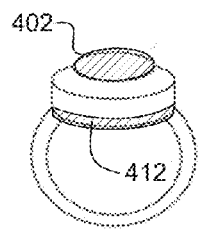
Figure 4E:
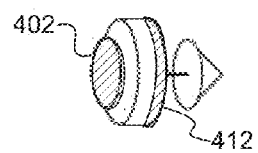
Figure 4C:
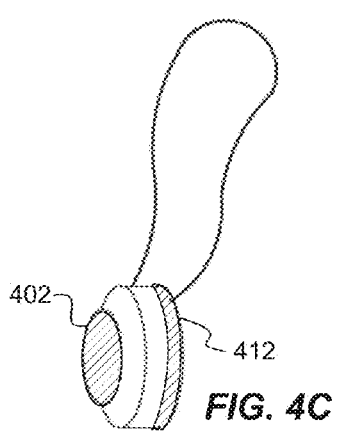

For example, FIG. 4A shows a wristwatch with body-facing electrode 412 on the back and outward-facing electrode 402 as the bezel around the face. FIG. 4B shows a bracelet with body-facing electrode 412 and outward-facing electrode 402 worked in as part of an artistic 3D design. FIG. 4C shows a pendant or locket with body-facing electrode 412 affixed to the back and outward-facing electrode 402 integrated in the front design. FIG. 4D shows a ring, and FIG. 4E an earring, with the requisite body-facing and outward-facing electrodes. These HBC jewelry embodiments may be used atone or together to form a body-coupled network.

Figure 4F:
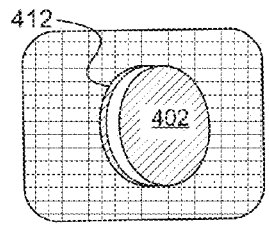
Figure 4G:
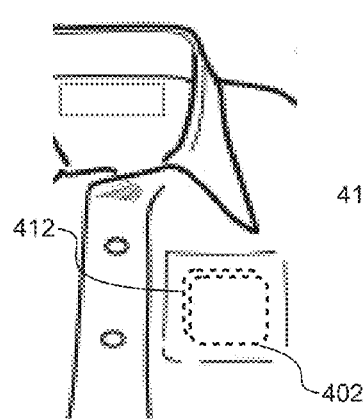
Figure 4H:
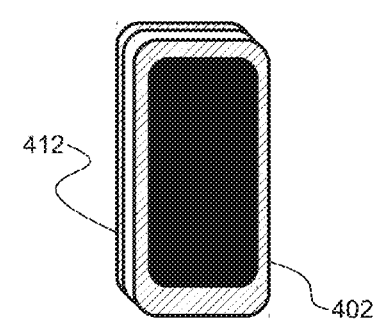

FIG. 4F shows a stick-on patch (e.g., with adhesive or look-and-loop tape such as Velcro™. For example, an HBC stick-on patch may be part of a temporary access badge for visitors to a workplace. FIG. 4G shows in HBCSM with the body-facing electrode 412 and outward-facing electrode 402 in a shirt pocket; some HBC devices only need the body-facing electrode to have close proximity to the skin rather than direct contact. FIG. 4H shows a mobile phone or digital music player with the outward-facing electrode 402 around the bezel of a display screen and body-facing electrode 412 in the back.

Applications for HBCSM devices are numerous and diverse. Sections of text, images, sound recordings, or files copied from an S-host computer may be pasted to the clipboard of an unconnected D-host computer.

An S-host computer's MAC address may be captured by an HBCSM and used to initiate the establishment of a wireless display (WiDi) connection with the D-host. Geo-coordinates may be copied from a mapping program to a GPS device, or vice versa. User account numbers, credentials, passwords, and related information can be stored on a wearable HBCSM for quick retrieval from anywhere.

For secure printing of sensitive information, an encrypted file can be sent to a public or non-exclusive printer and its keys or other credentials may be loaded onto an authorized user's HBCSM. The information in the encrypted file cannot be printed or read until the user physically goes to the printer, touches the HBC pad, and unlocks the file to be printed.

If point-of-sale devices are equipped with HBC pads, users can go quickly through the checkout line or pay for incidental things such as public transportation, tolls, laundry, and parking without needing exact change. Bellhops, doormen, valets, and other service people may have tips transferred from their customers HBCSMs to their own with a handshake.

The preceding Description and accompanying Drawings describe examples of embodiments in some detail to aid understanding. However, the scope of the claims may also include equivalents, permutations, and combinations that are not explicitly described herein.

We claim:

1. A data-storage device, comprising:
   a first electrode;
   a second electrode;
   a human body communication (HBC) modem coupled to the first electrode and the second electrode;
   a transmitter to transmit an HBC signal output from the HBC modem to the user's body and to an HBC electrode on an external device when the user is in direct contact with the HBC electrode;
   a receiver to receive an HBC signal input to the HBC modem from the user's body;
   a controller coupled to the HBC modem;
   a storage component coupled to the controller and to the HBC modem; and
   an indicator to produce a user-perceptible audible or haptic output in response to a connection between the data-storage device and a host device, and in response to completion of data transfer, wherein the first electrode faces towards the user's body and the second electrode faces away from the user's body to transfer data from the host device to an HBC storage device or from the HBC storage device to the host device through a body-coupled connection,
   and wherein the data-storage device is to be worn on the user's body.

2. The data-storage device of claim 1, wherein the data-storage device is part of a mobile communication device.

3. The data-storage device of claim 1, wherein the data-storage device is to be worn on the body as an article of jewelry.

4. The data-storage device of claim 1, wherein the data-storage device is to be worn on the body as a temporary stick-on patch.

5. The data-storage device of claim 1, further comprising an encryption module.

6. The data-storage device of claim 1, further comprising a decryption module.

7. The data-storage device of claim 1, further comprising a security module.

8. An HBC interface component, comprising:
   a first electrode to transmit and receive HBC signals;
   a second electrode;
   an HBC modem coupled to the first electrode and the second electrode;
   a controller coupled to the HBC modem and to a computational component of a host device; and
   an indicator to produce a user-perceptible audible or haptic output in response to a connection between the HBC interface component and an HBC storage device worn by a user on his or her body, and a completion of data transfer between the host device and the HBC storage device,
   wherein the HBC interface component establishes a connection with the HBC storage device in response to the user touching the first electrode.

9. The HBC interface component of claim 8, further comprising a module to interpret and recognize taps or gestures made on the electrodes.

10. The HBC interface component of claim 8, further comprising at least one of: a module to authenticate the user, or a module to obtain power to the HBC storage device from the host device upon the user touching the first electrode.

11. A system, comprising:
    an HBC storage device to be worn on a user's body;
    and a first host device comprising a first HBC interface which comprises an HBC electrode that is to receive an HBC signal output from the HBC storage device when the user is in direct contact with the HBC electrode;
    wherein, in response to contact between a first electrode on the HBC storage device and the user's skin or clothing and contemporaneous contact between the user's skin and a second electrode on the first HBC interface, the HBC storage device and the first host device are to establish a connection to transmit signals over the user's body surface;
    wherein the signals are to transfer data between the HBC storage device and the first host device; and
    wherein the HBC storage device is to produce a user perceptible audible or haptic output in response to the connection between the HBC storage device and the first host device, and in response to completion of data transfer between the first host device and the HBC storage device.

12. The system of claim 11, further comprising a second host device, wherein the second host device comprises a second HBC interface to receive data from the HBC storage device, wherein the data were previously transferred from the first host device to the HBC storage device.

13. The data-storage device of claim 1, further comprising a power supply connected to the controller.

14. The data-storage device of claim 1, further comprising an electrical power connection form the first electrode to the controller.

15. The system of claim 11, wherein the signals comprise control metadata.

16. The system of claim 11, wherein the first host device supplies power to the HBC storage device through the second electrode.

17. The system of claim 12, wherein the data comprises information to enable pairing the first host device to the second host device.

* * * * *

UNITED STATES PATENT AND TRADEMARK OFFICE
CERTIFICATE OF CORRECTION

Page 1 of 1

PATENT NO.         : 10,009,117 B2
APPLICATION NO.    : 14/583584
DATED              : June 26, 2018
INVENTOR(S)        : Jaroslaw J. Sydir et al.

It is certified that error appears in the above-identified patent and that said Letters Patent is hereby corrected as shown below:

In the Claims

Column 8
Line 26, Claim 14 "...form..." should read – "...from..."

Signed and Sealed this
Twenty-eighth Day of August, 2018

Andrei Iancu
*Director of the United States Patent and Trademark Office*